Aug. 1, 1961 C. J. WALKER 2,994,509
VARIABLE AREA TURBINE NOZZLE
Filed April 10, 1959
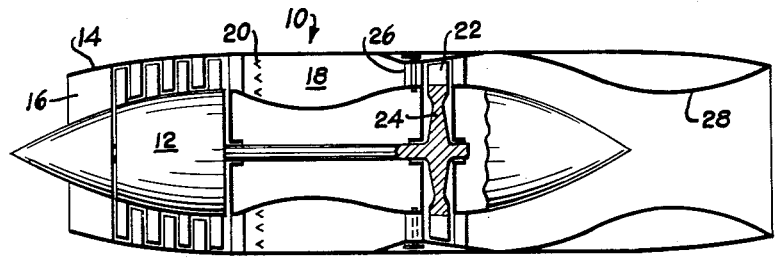
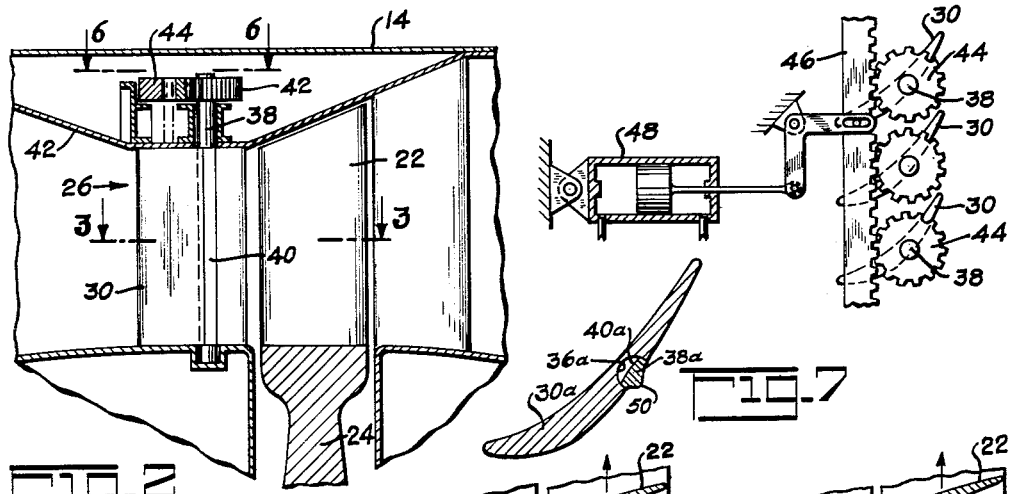
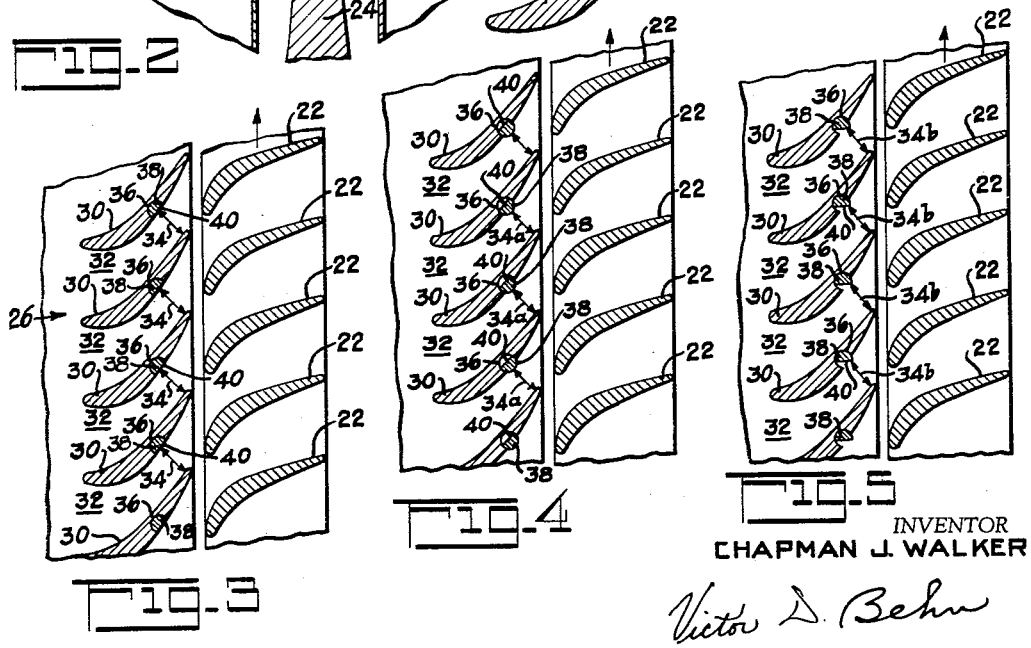
INVENTOR
CHAPMAN J. WALKER
BY
ATTORNEY

United States Patent Office 2,994,509
Patented Aug. 1, 1961

2,994,509
VARIABLE AREA TURBINE NOZZLE
Chapman J. Walker, Saddle River, N.J., assignor to Curtiss-Wright Corporation, a corporation of Delaware
Filed Apr. 10, 1959, Ser. No. 805,534
7 Claims. (Cl. 253—78)

This invention relates to gas turbine engines and is particularly directed to gas turbine engines having an adjustable turbine nozzle structure.

The invention is described in connection with the turbine nozzle stator vane structure for a gas turbine engine. It will become apparent, however, that the invention is also applicable to the stator vane structure of other fluid apparatus as, for example, vane-type fluid compressors or motors.

For high thermal efficiency a gas turbine engine should operate with a compressor pressure rise which is as high as possible without danger of compressor surge. In the case of a gas turbine engine for aircraft propulsion, the effective cross-sectional area of the turbine nozzle can be varied to provide high efficiency over a wide range of engine operating conditions. For example, when the engine is being started the cross-sectional area of the turbine nozzle may be increased to avoid compressor surge. Similarly during cold weather operation the turbine nozzle may be adjusted in an opening direction to avoid compressor surge. On the other hand during aircraft cruise operation or at high flight speeds it is possible to operate closer to compressor surge and therefore with higher efficiency if the turbine nozzle is adjusted in a closing direction.

It is an object of the present invention to provide a novel and simple structure for varying the throat area of the turbine nozzle structure of a gas turbine engine.

Other objects of the invention will become apparent when reading the annexed detailed description in connection with the drawing in which:

FIG. 1 is a schematic axial sectional view of a gas turbine engine embodying the invention;

FIG. 2 is an enlarged view of turbine and turbine nozzle portion of FIG. 1;

FIG. 3 is a developed section taken along line 3—3 of FIG. 2;

FIGS. 4 and 5 are views similar to FIG. 3 but illustrating the turbine nozzle in different positions of adjustment;

FIG. 6 is a view taken along line 6—6 of FIG. 2 and showing actuating mechanism for adjusting the nozzle; and FIG. 7 is a sectional view of a modified turbine nozzle guide vane structure.

Referring first to FIG. 1 of the drawing, a turbo-jet type gas turbine engine 10 for aircraft propulsion is illustrated as comprising an air compressor 12 rotatable within a housing 14 for supplying air from the forwardly directed air inlet 16 of said housing to the engine combustion chamber 18. Fuel is supplied to the combustion chamber by burner apparatus for combustion with the air supplied by the compressor. The combustion gases from the chamber 18 are directed against the rotor blades 22 of the engine turbine rotor 24 by a turbine nozzle structure 26 for driving said rotor. Hence, the combustion gases discharging from the chamber 18 constitute the turbine motive fluid. From the turbine rotor blades 22 the combustion gases discharge rearwardly through an exhaust nozzle 28 with the result that the engine is provided with forward propulsive thrust.

As illustrated in FIGS. 2–6, the turbine nozzle structure 26 comprises a plurality of circumferentially-spaced radially-extending guide vanes 30. Each vane 30 has a curved airfoil shape so that each intervane passage 32 has restricted or throat region 34 of minimum cross-sectional area. The portion of applicant's structure so far described is conventional.

In accordance with the present invention the throat area 34 of each intervane passage 32 is made adjustable. For this purpose a longitudinally-extending groove 36 is formed in one face of each vane 30 in the region of the throat 34 of the adjacent intervane passage. As illustrated, the groove 36 preferably is formed in the convex face of each vane 30.

Each groove 36 opens through the adjacent convex blade face and the profile of each cross-section of a groove 36 is a circular arc of more than 180° but less than 360°. An elongate or rod-like element 38 is disposed within each vane groove 36. The cross-section of each rod-like element 38 is such that a portion of the profile of each section is circular and of substantially the same radius as that of its groove 36 so that each element 38 is rotatably fitted within its groove 36. The remaining portion 40 of the profile of each rod-like element is relatively flat such that with a rod-like element in the rotative position illustrated in FIG. 3 its said remaining portion forms a smooth continuation of the adjacent portions of the convex face of its vane 30.

In FIG. 4 each rod-like element 38 has been rotated 180° from its position of FIG. 3. Therefore, in FIG. 4 each rod-like element projects laterally from the adjacent face portions of its vane 30 into the adjacent inter-vane passage 32 thereby reducing the passage throat area to a magnitude indicated at 34a in FIG. 4.

FIG. 5 illustrates each rod-like element rotated to a position intermediate that of FIGS. 3 and 4. Hence, in FIG. 5 each rod-like element 38 projects laterally into the adjacent intervane passage 32 but to a lesser extent than in FIG. 4. Accordingly, the throat area 34b in FIG. 5 of each inter-vane passage 32 is intermediate in magnitude to the throat areas 34 and 34a of FIGS. 3 and 4.

For rotatably adjusting the rod-like elements 38, each said element projects radially outwardly beyond the wall 42 forming the outer boundary for the turbine motive fluid. A gear 44 is secured to said projecting portion of each rod-like element and each gear 44 is disposed in meshing engagement with an annular rack 46 co-axial with the turbine 24. With this construction, rotation of the rack 46 is effective through the gears 44 to rotatively adjust each rod-like element 38. One or more fluid motors 48 are provided for rotatively adjusting the rod-like elements 38.

Like the circular profile of each groove 36, the circular portion of each rod-like element 38 is an arc of more than 180°. As a result, a portion of each rod-like element extends into its associated groove in all rotative positions of said elements as is evident from FIGS. 3, 4 and 5.

As illustrated each of the vanes 30 is provided with a groove 36 and with a rotatable rod-like element 38 for adjusting the adjacent inter-vane passage 32. Obviously, however, only certain of the vanes 30 may be provided with a groove 36 and rod-like element 38.

As illustrated, the rod-like elements 38 may be adjusted to the extreme positions of FIGS. 3 and 4 and to any intermediate position such as illustrated in FIG. 5. In a particular engine, the intermediate adjustments of FIG. 5 may be unnecessary. Also for reasons of simplicity it may be desirable to limit the adjustment of the rod-like elements 38 to the two extreme positions of FIGS. 3 and 4. With such a two position arrangement, the contour of the projecting portion of each rod-like element preferably has a more streamlined profile. Such a construction is illustrated in FIG. 7.

For ease of understanding, the parts of FIG. 7 corresponding to the parts of FIGS. 1–6 have been indicated by the same reference numerals but with a subscript *a* added thereto. The position of the rod-like element 38*a* in FIG. 7 is similar to the position of the rod-like elements 38 in FIG. 4.

As shown in FIG. 7, each rod-like element 38*a* has a relatively flat portion 40*a* and a diametrically opposite portion 50 which, in the position of FIG. 7, projects out into the adjacent inter-vane passage. This projecting portion 50 instead of being circular as in FIG. 4 is contoured to provide a smoother flow path for the adjacent fluid. Thus each end of the portion 50, particularly the downstream end, preferably merges smoothly with the adjacent contour of its guide vane 30*a*. In addition the downstream end of the portion 50 preferably has a more gradual slope as illustrated than the upstream end. The sides of each rod-like element 38*a* between the portions 40*a* and 50 are circular to fit the vane groove 36*a*.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A variable area nozzle structure for the motive fluid of a turbine compressor or like apparatus; said nozzle structure comprising a plurality of circumferentially-spaced fixed guide vanes providing passages therebetween for said motive fluid, each of said vanes having a groove extending longitudinally along and opening through one face thereof with the cross-section of each groove being an arc of a circle; a rod-like element rotatably fitted within each groove with each element having a side portion shaped so that in a first rotative position of said element said side portion forms a smooth continuation of the adjacent face portions of its vane and in a second rotative position another side portion of said element projects outwardly beyond the adjacent face portions of its vane into the adjacent inter-vane passage, said rod-like element being rotatably fitted within its associated groove in both of its said first and second rotative positions thereby closing said groove in both said positions.

2. A variable area nozzle structure as recited in claim 1 in which in its said second rotative position the projecting portion of each said rod-like element is contoured so that its downstream end merges smoothly with the adjacent face portion of its vane.

3. A variable nozzle structure as recited in claim 1 in which the profiles of the vane cross-sections are such as to provide each inter-vane passage with a throat region disposed along the associated rod-like element in all positions of said element.

4. A variable area nozzle as recited in claim 1 and including means operatively interconnecting said rod-like elements for simultaneous rotative adjustment.

5. A variable area turbine nozzle as recited in claim 4 in which each vane has a convex face and each said vane groove is formed in the convex face of its vane and in which the circular arc profile of each groove is more than 180° at each cross-section along the groove.

6. A variable area nozzle structure for the motive fluid of a turbine compressor or like apparatus; said nozzle structure comprising a plurality of circumferentially-spaced, radially-extending fixed guide vanes providing passages therebetween for the motive fluid, with the cross-section of each groove being an arc of a circle; a plurality of rod-like elements rotatably fitted in said grooves, there being one such element for each groove with each element having one side shaped so that in one rotative position of said element said side forms a smooth continuation of the adjacent face portions of its vane, the remaining portion of each rod-like element having a circular cross-section to fit its vane groove so that in other rotative positions of a rod-like element its circular portion projects beyond the adjacent face portions of its vane into the adjacent inter-vane passage, said rod-like element being rotatably fitted within its associated groove in both of its said first and second rotative positions thereby closing said groove in both said positions.

7. A variable nozzle structure as recited in claim 6 in which the profiles of the vane cross-sections are such as to provide each inter-vane passage with a throat region disposed along the associated rod-like element in all positions of said element and in which each vane has a convex face and its said groove is formed in said convex face.

References Cited in the file of this patent

UNITED STATES PATENTS

| 2,648,195 | Wilde et al. | Aug. 11, 1953 |
| 2,789,808 | Blackman | Apr. 23, 1957 |
| 2,805,818 | Ferri | Sept. 10, 1957 |
| 2,823,700 | Christensen | Feb. 18, 1958 |

FOREIGN PATENTS

| 659,211 | Germany | Apr. 28, 1938 |